United States Patent [19]

Shimizu et al.

[11] Patent Number: 4,742,882
[45] Date of Patent: May 10, 1988

[54] MOTOR-DRIVEN POWER STEERING DEVICE

[75] Inventors: Yasuo Shimizu; Toshitake Kawai; Mitsutaka Sugino, all of Saitama, Japan

[73] Assignee: Honda Giken Kogyo Kabushiki Kaisha, Tokyo, Japan

[21] Appl. No.: 24,047

[22] Filed: Mar. 10, 1987

[30] Foreign Application Priority Data

Mar. 12, 1986 [JP] Japan .............................. 61-36005[U]
Jul. 16, 1986 [JP] Japan ........................... 61-109122[U]

[51] Int. Cl.⁴ .............................................. B62D 5/04
[52] U.S. Cl. .................................... 180/79.1; 180/148
[58] Field of Search ................................ 180/79.1, 148

[56] References Cited

U.S. PATENT DOCUMENTS 4,408,673 10/1983 Leiber .................................... 180/148
4,415,054 11/1983 Drutchas ........................... 180/79.1

FOREIGN PATENT DOCUMENTS 59-50864 3/1984 Japan .
60-25853 2/1985 Japan .

*Primary Examiner*—John J. Love
*Assistant Examiner*—Donn McGiehan
*Attorney, Agent, or Firm*—Irving M. Weiner; Joseph P. Carrier; Pamela S. Burt

[57] ABSTRACT

A motor-driven power steering device includes an electric motor for generating assistive torque which is applied through a ball screw mechanism to a steering gear mechanism to reduce manual steering forces applied by the driver to steer a motor vehicle. The motor-driven power steering device comprises a rack-and-pinion steering gear mechanism for converting the rotation of a pinion shaft to axial movement of a rack shaft, an electric motor for generating assistive torque to be applied to the rack-and-pinion steering gear mechanism, and a ball screw mechanism for converting the assistive torque from the motor to the axial movement of the rack shaft. The ball screw mechanism has a screw shaft having a helical groove defined in an outer peripheral surface thereof and extending substantially parallel to the rack shaft, the screw shaft being receptive of the assistive torque generated by the motor, a nut having a helical groove defined in an inner peripheral surface thereof and disposed around the screw shaft, the nut being nonrotatably coupled to the rack shaft, and a plurality of balls disposed in and between the helical grooves of the screw shaft and the nut.

8 Claims, 2 Drawing Sheets

MOTOR-DRIVEN POWER STEERING DEVICE

BACKGROUND OF THE INVENTION

1. Field of the Invention

The present invention relates to a motor-driven power steering device for applying assistive steering torque produced by an electric motor to a steering mechanism, thereby reducing the manual steering forces required to steer a motor vehicle.

2. Description of the Relevant Art

Conventional motor-driven power steering devices employing electric motors for generating assistive steering torque are disclosed in Japanese Laid-Open Patent Publications Nos. 60(1985)-25853 and 59(1984)-50864 (corresponding to U.S. Pat. No. 4,415,054 patented Nov. 15, 1983), for example. The disclosed motor-driven power steering devices have a ball screw mechanism including a screw shaft comprising a rack shaft of a rack-and-pinion steering gear mechanism, with a helical groove defined in an outer peripheral surface thereof, a nut disposed over the screw shaft and having a helical groove defined in an inner peripheral surface thereof, and balls received in the helical grooves of the screw shaft and the nut.

In the former Japanese Patent publication, a speed reduction gear is integrally formed with the outer periphery of the nut of the ball screw mechanism, and a pinion meshing with the speed reduction gear is coupled through a clutch to a motor which produces assistive torque. Therefore, the torque of the motor is transmitted through the clutch, the pinion, and the speed reduction gear to the nut, and then is converted by the ball screw mechanism to axial linear motion applied to the rack shaft.

According to the latter Japanese Patent publication, the rotor of a motor is fixed to the outer periphery of the nut of the ball screw mechanism. Therefore, the motor is directly coupled to the ball screw mechanism.

The motor-driven power steering devices employing the ball screw mechanisms as described above suffer a small frictional loss, and hence have a high power transmission efficiency which leads to smooth power steering operation.

However, the above motor-driven power steering devices have been liable to fail to operate smoothly and also to have a durability problem since the rack shaft has a helical groove and serves as the screw shaft of the ball screw mechanism. More specifically, an axial or shearing load is applied to the rack shaft from wheels through knuckle arms and tie rods. When the vehicle is steered, the steering force is imposed on the rack shaft from the pinion shaft, and assistive torque is also applied to the rack shaft from the motor via the ball screw mechanism. Therefore, the rack shaft tends to flex under a bending moment, and to vibrate slightly in a radial direction due to movement of the meshing rack and pinion.

Generally, the ball screw mechanisms have an extremely low margin for shearing loads or stresses. When the screw shaft flexes or vibrates, the helical groove of the nut is apt to be damaged, and/or undue stresses act on the balls riding in the helical grooves. The balls under such undue stresses cannot rotate smoothly, with the results that the motor torque will not be transmitted efficiently, the steering feeling of the driver may be impaired, and/or the durability of the motor-driven power steering system will be lowered.

With the rack shaft helically grooved on its outer periphery, the mechanism for transmitting assistive torque cannot easily be maintained or serviced since it is troublesome to detach such mechanism. Lack of interchangeability of the grooved rack shaft and the rack shaft of an existing manually operated steering device results in an increased cost of the power steering devices, and makes it difficult to convert existing manually operated steering devices into motor-driven power steering devices.

Where a ball screw mechanism is employed in a motor-driven power steering device, the power transmission efficiency is higher as the lead angle of the helical groove on the screw shaft is larger. Inasmuch as the lead angle is determined by the magnitude of the output torque of the motor, if the motor used has a torque capacity greater than a certain torque level, then it is better to reduce the diameter of the screw shaft in a manner commensurate with the torque capacity of the motor for achieving a higher power transmission efficiency.

With the aforesaid conventional motor-driven power steering devices, however, the diameter of the screw shaft could not be reduced beyond its range providing desired mechanical strength since the rack shaft used as the screw shaft is helically grooved and subject to large axial and shearing loads. Therefore, the power transmission efficiency of the conventional motor-driven power steering devices is relatively low. It has also been difficult to improve characteristics of the power steering devices at the time of returning to the neutral position.

Additionally, the helical groove provided on the axially movable rack shaft over a certain length fails to provide a seal between the rack shaft and its housing, thus allowing dust to enter and rust to be formed in the ball screw mechanism.

SUMMARY OF THE INVENTION

It is an object of the present invention to provide a motor-driven power steering device which ensures smooth operation and increases durability of a ball screw mechanism that converts assistive torque from a motor to axial movement of a rack shaft, for higher power transmission efficiency of the ball screw mechanism, which has improved characteristics at the time of returning to its neutral position, and which provides an easy and reliable seal on the rack shaft.

According to the present invention, a motor-driven power steering device comprises a rack-and-pinion steering gear mechanism having a housing, and a pinion shaft and a rack shaft which are movably accommodated in the housing, the rack-and-pinion steering gear mechanism being operable to convert rotation of the pinion shaft to axial movement of the rack shaft, an electric motor mounted on the housing for generating steering assistive torque to be applied to the rack-and-pinion steering gear mechanism, a screw shaft having a helical groove defined in an outer peripheral surface thereof and extending substantially parallel to the rack shaft, the screw shaft being receptive of the assistive torque generated by the motor, nut means having a helical groove defined in an inner peripheral surface thereof and disposed around the screw shaft, the nut means being nonrotatably coupled to the rack shaft, and a plurality of balls disposed in and between the helical grooves of the screw shaft and the nut means.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
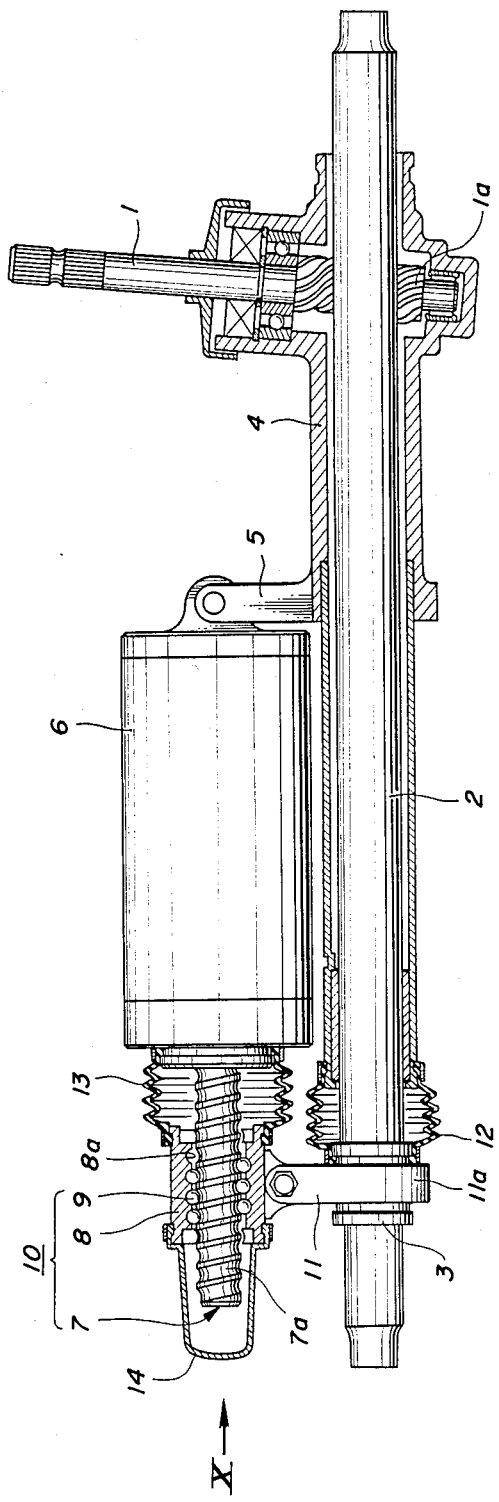
FIG. 1 is a longitudinal cross-sectional view of a motor-driven power steering device according to an embodiment of the present invention.

As shown in FIG. 1, a pinion 1a is disposed on the lower end of a pinion shaft 1 coupled to a steering shaft (not shown) of a motor vehicle such as an automobile. A rack shaft 2 extending substantially perpendicularly to the pinion shaft 1 has a rack meshing with the pinion 1a. Therefore, rotation of the pinion shaft 1 about its own axis moves the rack shaft 2 in the axial direction thereof. The rack of the rack shaft 2 is not shown in FIG. 1 since it is provided on the back of the rack shaft 2.

A resilient member 3 is disposed around one end of the rack shaft 2 remotely from the pinion 1a. The rack shaft 2 is axially displaceably supported in a rack housing 4. The housing 4 has a support arm 5 projecting radially outwardly from an intermediate portion of the housing 4. An electric motor 6 for generating assistive torque is pivotally supported at its rear end on the distal end of the support arm 5, the motor 6 having an output shaft 7 extending away from the support arm 5. When the motor vehicle is not steered, the rack shaft 2 and the motor output shaft 7 lie substantially parallel to each other.

The output shaft 7 has a helical groove 7a defined in the outer peripheral surface thereof. A non-rotatable nut 8 having a helical groove 8a defined in the inner peripheral surface thereof is disposed around the output shaft 7, with a plurality of balls 9 riding in and between the helical grooves 7a, 8a. The output shaft 7, the nut 8, and the balls 9 jointly constitute a ball screw mechanism 10. A joint member 11 has one end pivotally connected to the nut 8 and the opposite end 11a shaped as a ring fitted over the resilient member 3 on the rack shaft 2. The joint member 11 is coupled to the rack shaft 2 normally in substantially perpendicular relation to the rack shaft 2. Movement of the nut 8 on the output shaft 7 as it is axially moved by the motor 6 is transmitted by the joint member 11 to the rack shaft 2.

A bellows-shaped boot 12 extends between and is joined to the confronting ends of the housing 4 and the resilient member 3. Similarly, another bellows-shaped boot 13 extends between and is joined to the confronting ends of the motor 6 and the nut 8. A cover or cap 14 is attached to the other end of the nut 8 in covering relation to the distal end of the output shaft 7 which projects from the nut 8. The boot 12 serves to prevent dust from entering the housing 4. The boot 13 and the cap 14 are effective in preventing dust from entering the ball screw mechanism 10.

The motor 6 and the nut 8 are pivotally supported on, but actually substantially fixed to, the support arm 5 and the joint member 11, respectively. Specifically, the motor 6 and the joint member 11 are coupled to the support arm 5 and the nut 8, respectively, such that the motor 6 and the joint member 11 are slightly angularly movable with respect to the support arm 5 and the nut 8, respectively. The resilient member 3 is substantially hard with low flexibility.

The motor-driven power steering device thus constructed operates as follows: When a steering wheel (not shown) coupled to the steering shaft is turned, the pinion shaft 1 is rotated about its own axis thereby moving the rack shaft 2 to the left, for example, through meshing engagement between the rack and the pinion 1a. Information representative of the rotational speed and torque of the steering shaft coupled to the steering wheel is supplied to a control unit (not shown) and analyzed thereby. The control unit then controls the motor 6 to rotate the output shaft 7 clockwise as viewed in the direction of the arrow X. The nut 8 of the ball screw mechanism 10 is axially moved to the left. The movement of the nut 8 is transmitted through the joint member 11 as assistive torque to the rack shaft 2.

As the rack shaft 2 is axially displaced by the rotation of the pinion shaft 1, an axial load (leftward) is applied to the rack shaft 2, producing a bending moment on the rack shaft 2. The bending moment acts to force the rack shaft 2 and the output shaft 7 out of parallelism into a slightly angularly spaced condition.

The angularly spaced condition is however absorbed by the pivotal connections between the motor 6 and the support arm 5 and between the nut 8 and the joint member 11, or by the flexibility of the resilient member 3 on which the ring-shaped end 11a of the joint member 11 is fitted. Therefore, no undue loads or stresses are applied to the balls 9 of the ball screw mechanism 10.

Accordingly, the power steering device has a high efficiency of transmitting the torque of the motor 6 to the rack shaft 2 through the ball screw mechanism 10. Since the nut 8 is not rotated but the output shaft 7 is rotated instead, the moment of inertia of the ball screw mechanism 10 is small, giving a good steering feeling to the driver who turns the steering wheel. The ball screw mechanism 10 and the motor 6 can easily be detached from the rack shaft 2 and the housing 4 for efficient maintenance and servicing. The power steering device of the invention can be installed on existing manually operated steering systems, so that existing manually steered motor vehicles can easily be converted into power-steered motor vehicles.

Figure 2:
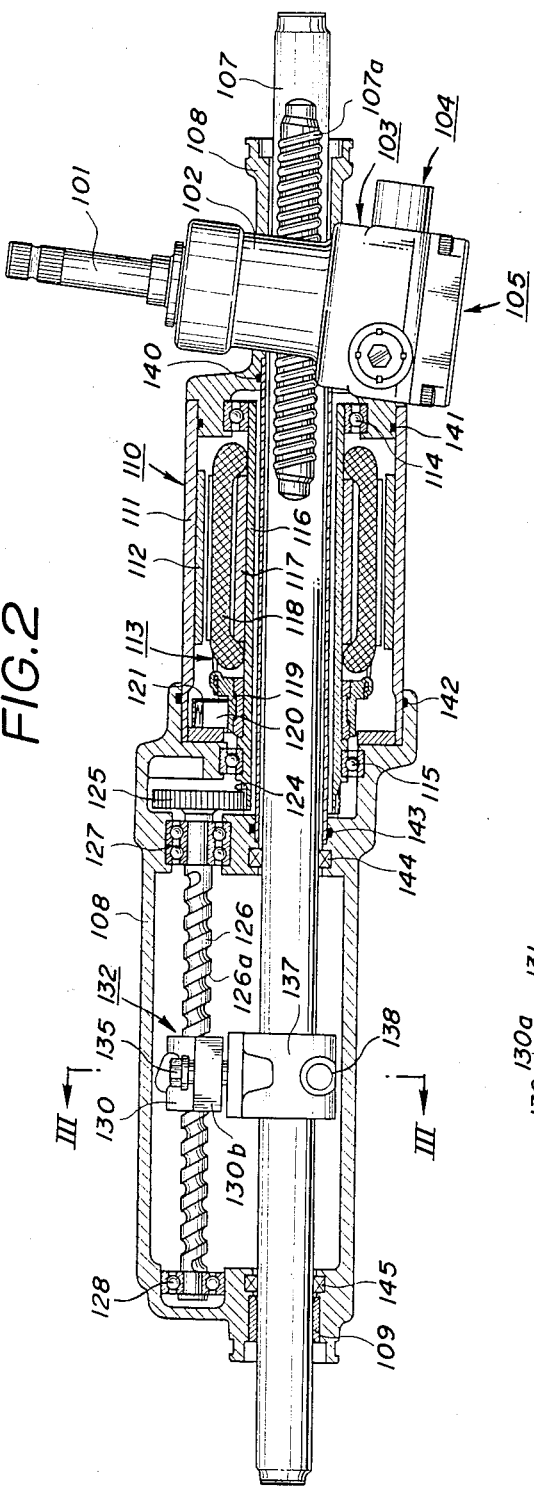
FIG. 2 is a longitudinal cross-sectional view of a motor-driven power steering device according to another embodiment of the present invention.
Figure 3:
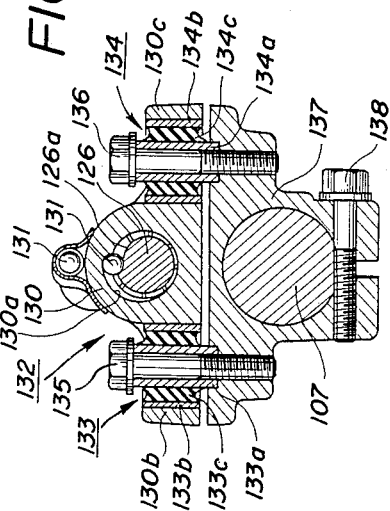
FIG. 3 is a cross-sectional view taken along line III—III of FIG. 2.

FIGS. 2 and 3 illustrate a motor-driven power steering device according to another embodiment of the present invention. As shown in FIG. 2, a pinion shaft 101 is coupled to a steering wheel through a steering shaft (not shown) and rotatably supported by a pinion holder 102. The pinion holder 102 supports a steering torque sensor 103, a steering rotation sensor 104, and a control unit 105 which controls an electric motor 110 based on detected signals from the sensors 103, 104. A rack shaft 107 has a rack 107a meshing with a pinion (not shown) on the pinion shaft 101. The rack shaft 107 is supported in a rack housing 108 and axially movable in response to rotation of the pinion shaft 101.

The motor 110 is disposed around the rack shaft 107. The motor 110 includes a cylindrical stator 111 fixed to the rack housing 108, at least a pair of magnets 112 secured to the inner surface of the stator 111, and a rotor 113 rotatably disposed around the rack shaft 107. The rotor 113 has a cylindrical shaft 116 rotatably supported in the housing 108 by means of bearings 114, 115 around the rack shaft 107. On and around the cylindrical shaft 116, there are successively disposed an iron core 117 having a skew groove and a multiple winding 118. A commutator 119 electrically connected to the multiple winding 118 is also mounted on the cylindrical shaft 116. A brush 120 pressed against the commutator 119 is accommodated in a brush holder 121 affixed to the housing 108. The brush 120 and the control unit 105 are electrically connected by lead wires.

The cylindrical shaft 116 has an integral gear 124 on the outer periphery of the lefthand end thereof. The gear 124 is held in mesh with a gear 125 integrally fixed to the righthand end of a screw shaft 126 having a helical groove 126a defined in an outer peripheral surface thereof over a certain length. The screw shaft 126 lies in the rack housing 108 parallel to the rack shaft 107, and has opposite ends rotatably supported on the housing 108 by means of respective bearings 127, 128. Therefore, the screw shaft 126 is operatively coupled through the gears 124, 125 to the motor 110, and is hence rotatable about its own axis by the motor 110. In other words, the screw shaft 126 is effectively an output shaft of the motor 110.

As illustrated in FIG. 3, a nonrotatable nut 130 having a helical groove 130a defined in the inner peripheral surface thereof is disposed around the screw shaft 126, with a plurality of balls 131 received in the helical grooves 126a, 130a of the screw shaft 126 and the nut 130. The screw shaft 126, the balls 131, and the nut 130 jointly serve as a ball screw mechanism 132. The nut 130 has oppositely directed flanges 130b, 130c fastened to a joint member 137 by means of bolts 135, 136, respectively, with bushings 133, 134 disposed around the bolts 135, 136, respectively. The joint member 137 is fixed to the rack shaft 107 by means of a bolt 138. Therefore, axial movement of the nut 130 along the screw shaft 126 is transmitted to the rack shaft 107 to move the latter in the axial direction thereof. The bushings 133, 134 comprise respective inner sleeves 133a, 134a, respective outer sleeves 133b, 134b, and respective resilient members 133c, 134c interposed between the inner and outer sleeves 133a, 133b and 134a, 134b, respectively. The resilient members 133c, 134c are comparatively hard, but of such a degree of flexibility that will allow the screw shaft 126 and the rack shaft 107 to be slightly angularly displaced out of parallelism under stresses or loads. Therefore, even when a bending moment is applied to the rack shaft 107 due to steering reactive forces, such a bending moment is absorbed by the resilient members 133c, 134c thereby to prevent undue loads or stresses from being imposed on the screw shaft 126.

The screw shaft 126 of the ball screw mechanism 132 is separate from the rack shaft 107. Consequently, the screw shaft 126 may be of a reduced diameter, and hence the lead angle of the helical groove 126a may be large for an increased power transmission efficiency of the ball screw mechanism 132. When the steering wheel turns back to its neutral position, axial movement of the nut 130 is converted to rotation of the screw shaft 126. Thus, the response of the power steering device is high and the driver's steering feeling upon steering action is improved. As the power transmission efficiency of the power steering device is high, the output loss and electric power consumption of the motor 110 as it is energized are relatively low.

Since the rack shaft 107 is not helically grooved, it is interchangeable with the rack shaft of a manually operated power steering device, and can easily be sealed against entry of dust and formation of rust. The rack shaft 107 is thus highly reliable in operation.

The motor 110 is disposed concentrically around the rack shaft 107, with no ball screw mechanism interposed therebetween. This is advantageous in that the rotor 113 of the motor 110 may be of a large diameter for producing an increased output torque while at the same time the motor 110 may be of a small profile allowing the overall power steering device to have a compact size. Because the output of the motor 110 can be increased, the lead angle of the ball screw mechanism 132 can be increased for a much higher power transmission efficiency, and the maximum rotational speed of the motor 110 can be lowered, thereby reducing noise generated by the power steering device.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A motor-driven power steering device comprising:
    a rack-and-pinion steering gear mechanism having a housing, and a pinion shaft and a rack shaft which are movably accommodated in said housing, said rack-and-pinion steering gear mechanism being operable to convert rotation of said pinion shaft to axial movement of said rack shaft;
    an electric motor mounted on said housing for generating steering assistive torque to be applied to said rack-and-pinion steering gear mechanism;
    a screw shaft having a helical groove defined in an outer peripheral surface thereof and extending substantially parallel to said rack shaft, said screw shaft being rotatably coupled to said motor;
    nut means having a helical groove defined in an inner peripheral surface thereof and disposed around said screw shaft, said nut means being non rotatable and coupled to said rack shaft; and
    a plurality of balls disposed in and between said helical grooves of said screw shaft and said nut means.

2. A motor-driven power steering device according to claim 1, wherein said screw shaft comprises an output shaft of said motor whereby rotation of said motor can be transmitted directly to said screw shaft.

3. A motor-driven power steering device according to claim 2, wherein said motor is coupled to said housing and angularly movable in a relatively small angle range.

4. A motor-driven power steering device according to claim 2, wherein said nut means includes a joint member and is coupled by said joint member to said rack shaft for angular movement in a relatively small angle range.

5. A motor-driven power steering device according to claim 4, wherein said joint member is fitted over said rack shaft through a resilient member.

6. A motor-driven power steering device according to claim 1, wherein said motor is disposed concentrically around said rack shaft and has an output shaft having a first gear, said screw shaft having a second gear held in mesh with said first gear, whereby rotation of said motor can be transmitted to said screw shaft through said first and second gears.

7. A motor-driven power steering device according to claim 6, wherein said nut means includes a joint member and is coupled by said joint member to said rack shaft for angular movement in a relatively small angle range.

8. A motor-driven power steering device comprising:
a rack-and-pinion steering gear mechanism having a housing, a pinion shaft and a rack shaft which are movably accommodated in said housing, said rack-and-pinion steering gear mechanism being operable to convert rotation of said pinion shaft to actual movement of said rack shaft;
an electric motor disposed around said rack shaft for generating steering assistive torque to be applied to said rack-and-pinion steering gear mechanism;
a screw shaft having a helical groove defined in an outer peripheral surface thereof and extending substantially parallel to said rack shaft, said screw shaft being rotatably coupled to said motor;
nut means having a helical groove defined in an inner peripheral surface thereof and disposed around said screw shaft, said nut means non-rotatable and coupled to said rack shaft; and
a plurality of balls disposed in and between said helical grooves of said screw shaft and said nut means.

* * * * *